Nov. 1, 1955  M. D. RUBIN  2,722,607
FREQUENCY CONTROL
Original Filed May 25, 1948  3 Sheets-Sheet 1
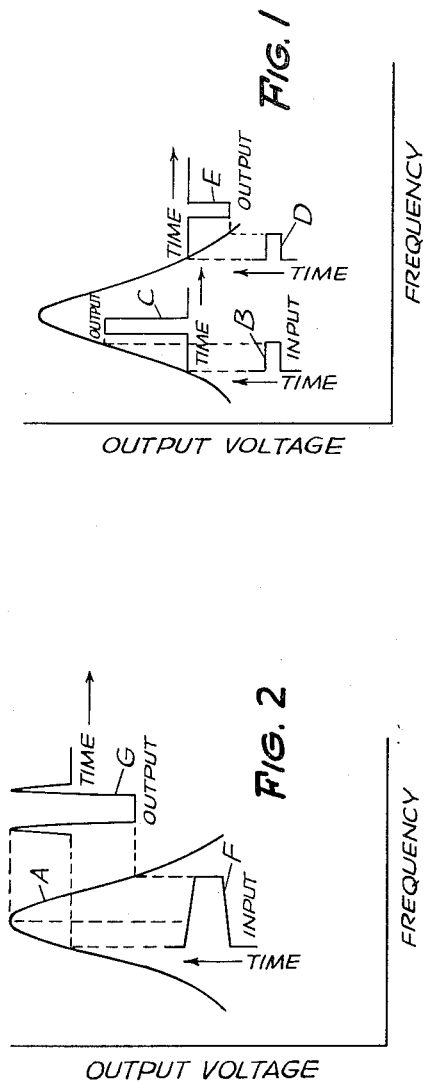
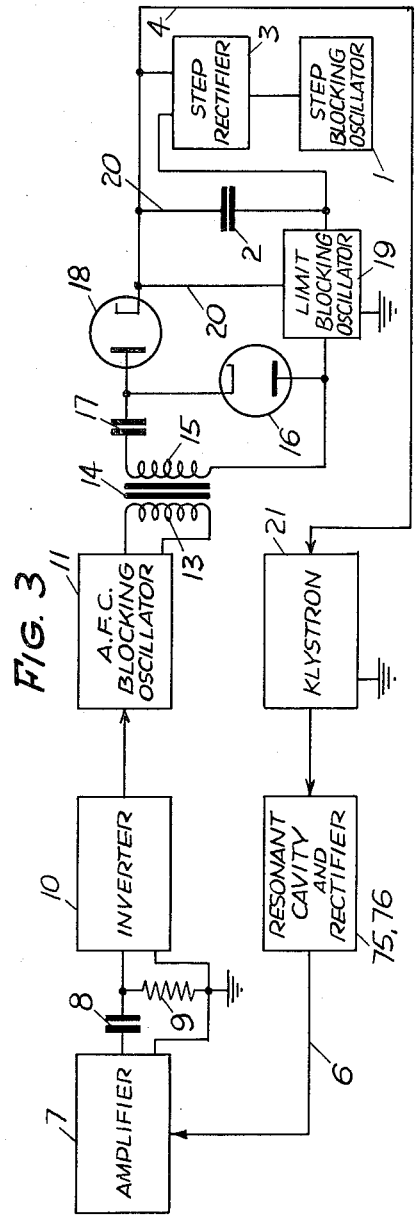
INVENTOR
MILTON D. RUBIN
BY Elmer J. Gorn
ATTORNEY INVENTOR
MILTON D. RUBIN
BY Elmer J. Gorn
ATTORNEY Nov. 1, 1955 M. D. RUBIN 2,722,607
FREQUENCY CONTROL
Original Filed May 25, 1948 3 Sheets—Sheet 3

INVENTOR
MILTON D. RUBIN
BY
ATTORNEY

United States Patent Office 2,722,607
Patented Nov. 1, 1955

2,722,607

FREQUENCY CONTROL

Milton D. Rubin, Dorchester, Mass., assignor to Raytheon Manufacturing Company, Newton, Mass., a corporation of Delaware Original application May 25, 1948, Serial No. 29,004, now Patent No. 2,547,890, dated April 3, 1951. Divided and this application February 23, 1951, Serial No. 212,341

4 Claims. (Cl. 250—36)

This application is a division of my copending application, Serial No. 29,004, filed May 25, 1948, now Patent No. 2,547,890, issued April 3, 1951.

This invention relates to electrical circuits, and more particularly to a pulse servo system suitable for frequency stabilization or automatic frequency control of a generator.

An object of this invention is to devise an automatic frequency control system which is rugged and reliable, and which is unaffected by microphonics, such as those generated by vibrations.

A further object is to devise a novel automatic frequency control system for a reflex klystron oscillator.

A still further object is to provide a servo system having a sweeping or hunting characteristic such that, if the system is in a state in which no servo information is being generated, the system will sweep through all possible states in succession until it does come into a region of operation in which servo information is generated, after which it will oscillate in a small neighborhood about the desired state.

An additional object is to devise a servo system in which the error detector of the system need not have sense; that is, its output need not have opposite polarities above and below its center value.

Yet another object is to devise a novel error detector for an automatic frequency control servo system.

Still another object is to devise a novel clamping circuit arrangement which is useful in connection with a blocking oscillator.

Another object is to provide a sweep circuit utilizing a condenser which is charged in a novel manner to provide a desired voltage variation thereon.

A further object is to devise a novel system for causing the voltage on a condenser to oscillate back and forth through a small range about a desired value.

The foregoing and other objects of the invention will be best understood from the following description of an exemplification thereof, reference being had to the accompanying drawings, wherein:

Figs. 1 and 2 are curves useful in explaining the operation of the invention;

Fig. 3 is a combined schematic and block diagram of a servo system embodying the invention;

Figure 4:
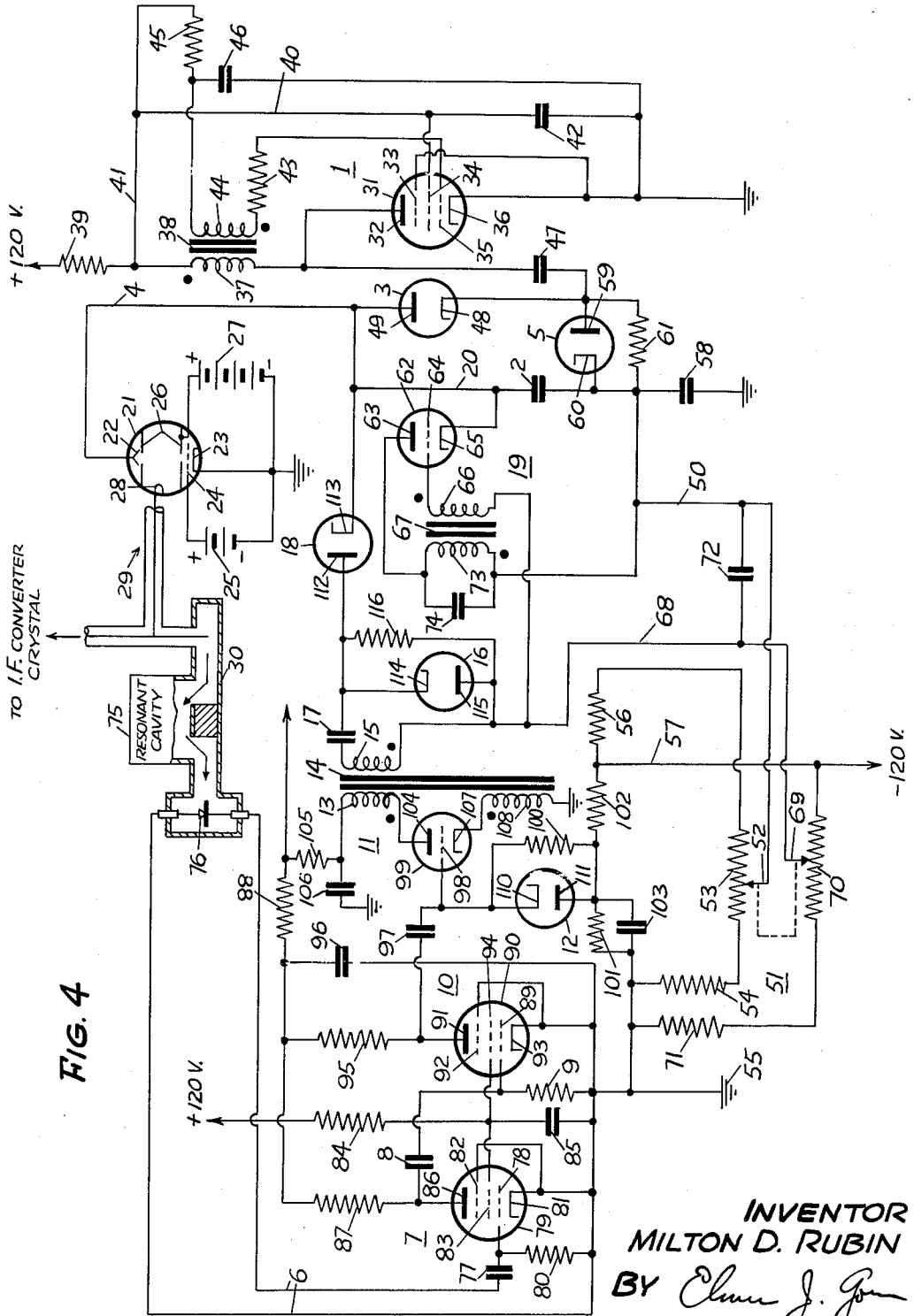
Fig. 4 is a circuit diagram of an embodiment of this invention.

In certain systems which use a local oscillator for mixing or for other purposes, it is desired that the output frequency of the said oscillator not vary more than a small amount on either side of a predetermined frequency to which the oscillator has been adjusted. If the local oscillator is a reflex klystron, as disclosed illustratively herein, undesired variations or discrepancies in the output frequency may result from changes in the internal dimensions of the klystron's resonant cavity, from changes in the resonator potential, or from other causes. The present invention provides an automatic frequency control system for such a local oscillator.

For the purposes of the present invention, in which the local oscillator may have a frequency on the order of 9,000 megacycles, for example, the frequency used dictates the choice of a resonant cavity as a sufficiently rugged, simple and reliable reference standard of frequency. A portion of the output signal of the oscillator, the frequency of which is to be controlled, is passed through the reference cavity, and the rectified output of the cavity is examined. If the cavity is of the transmission type, the output as a function of frequency is, as represented by curve A in Fig. 1, a symmetrical resonance curve centered at the resonant frequency of the cavity. In such a case, the magnitude of the rectified output of the cavity indicates the degree of error from the cavity resonant frequency but not the direction therefrom. However, if the frequency of the signal feeding into the cavity is modulated slightly, the sign of the rectified modulation signal of the output is the same as that of the modulation signal of the input if the carrier or rest frequency is in the region of positive slope of the resonance curve A, and vice versa if in the negative slope region of said curve, thus indicating whether the signal is above or below the cavity resonant frequency. By this means, both direction and degree of error are indicated by the output of the cavity, and correction can be applied to the oscillator accordingly.

According to this invention, pulse frequency modulation is used instead of sinusoidal or other type of continuous frequency modulation, in order to eliminate the phase-determining or phase-comparison devices necessary with such continuous frequency modulation. In Fig. 1, consider a pulse frequency modulation input signal B which is applied when the carrier or rest frequency is below the resonant frequency of curve A or in the region of positive slope thereof. Such an input signal will produce a rectified output modulation signal of the character shown at C, the amplitude of this signal being determined by projecting the upper and lower frequency limits of signal B to curve A to obtain corresponding output limits for output pulse C, and the length (in time) of pulse signal C being equal to that of signal B. Under these conditions (when the carrier or rest frequency is below the resonant frequency), the output pulse C is of the same sign as the input pulse B.

Now consider a pulse frequency modulation input signal D which is applied when the carrier or rest frequency is above the resonant frequency of curve A or in the region of negative slope thereof. Such an input signal will produce a rectified output modulation signal of the character shown at E, the amplitude of this signal being determined by projecting the upper and lower frequency limits of signal D to curve A to obtain corresponding output limits for output pulse E, and the length (in time) of pulse signal E being equal to that of signal D. Under these conditions (when the carrier or rest frequency is above the resonant frequency), the output pulse E is of the opposite sign to input pulse D.

Thus, the direction of error is indicated by the relative polarity of the output pulse, the degree of error being indicated for the illustration described by the relative amplitude of the output pulse.

As illustrated by Fig. 2, there is some ambiguity when the rest or carrier frequency is near the resonant frequency. Consider a pulse frequency modulation input signal F which is applied at such a point with reference to the carrier or rest frequency as to span the resonant frequency of curve A. Such an input signal will produce a rectified output modulation signal of the character shown at G, the amplitude and time width of this signal being determined as described hereinabove. Pulse output signal G contains both minus and plus portions, so that in this situation there is some ambiguity as to the direction of error. However, the narrow positive portions of output signal G can be substantially eliminated in succeeding circuits if the rise and fall times of input pulse F are considerably less than the duration of the flat top thereof; in this way, the ambiguity may be removed. It should be noted that, even though the base line of input signal F is below the cavity resonant frequency, the output signal G is of opposite sign to the input signal F, or is reversed with respect thereto. This means that the target frequency of the automatic frequency control system will be offset from the resonant frequency of the reference cavity to a little below said resonant frequency, since the target frequency of the system according to the present invention is the frequency at which the output signal reverses with respect to the input signal. The amount of offset can be decreased by reducing the input pulse amplitude. As a matter of fact, the amplitudes of the pulse input signals B, D and F are greatly exaggerated in Figs. 1 and 2, as compared with the amplitudes of the pulse frequency modulation input signals actually used in the present invention.

It is known to those skilled in the art that the output frequency of a reflex klystron may be corrected or controlled by appropriate changes in the repeller potential of such klystron. When a resonant cavity is used as a reference standard of frequency, regardless of what type of error detector is used, there is a restricted lock-in range around the resonant frequency of the cavity, outside of which the rectified output from the "plumbing" is too low to operate the servo system. Therefore, a sweep circuit is incorporated so that, when the unit is turned on, the klystron output frequency will be swept automatically through the electrical tuning range of said klystron until it is within lock-in range.

In the servo system of the present invention, a staircase or stepwise sweep or frequency modulation or frequency variation of the klystron is caused to occur, pulses for error detection and frequency control being obtained from this sweep by differentiation of the rectified output of the reference cavity which is coupled to the klystron output.

Fig. 3 is a combined schematic and block diagram of a servo system according to this invention. To generate the sweep voltage necessary to vary the frequency of klystron 21 in steps on the order of 500 kilocycles per step, a free-running step blocking oscillator 1, running at a repetition rate on the order of 200,000 pulses per second, is employed. Condenser 2 is originally step-charged from blocking oscillator 1, through a step rectifier 3, in a direction such that the potential of the upper plate of said condenser becomes negative with respect to the lower plate thereof, as represented by the stepped portion of the waveform in Fig. 5, which represents the staircase waveform of the voltage of the upper plate of condenser 2 with respect to ground under sweeping or hunting conditions. By means of lead 4, the voltage on the upper plate of condenser 2 is applied to the repeller of klystron 21, so that Fig. 5 also represents the waveform of the voltage on the klystron repeller with respect to its cathode or ground under sweeping or hunting conditions. Since the step-charging of condenser 2 is in a negative direction, the stepwise of pulse frequency modulation or frequency variation of the klystron 21 is from low to high frequency.

By way of illustration only, to vary the voltage across condenser 2 and on the klystron repeller by —18 volts, and to vary the klystron frequency by approximately 60 megacycles, 120 steps are required from the step blocking oscillator 1; the pulse output of said oscillator is therefore such that each step produces a change of —0.15 volt, which in turn causes the klystron frequency to change 500 kilocycles per step.

Figure 6:
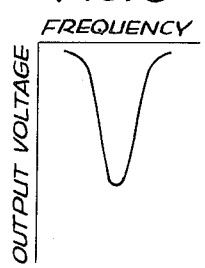

A portion of the output from the controlled klystron 21 is passed through a tuned or resonant cavity 75 having a frequency-output response characteristic as indicated in Fig. 6. This characteristic has the same shape as the curves A of Figs. 1 and 2 previously described, but is shown reversed and in the negative direction because this sort of a response characteristic is needed with the number of amplifier tubes used, for correct trigger polarity. Such a reversal of characteristic from those of Figs. 1 and 2 may be easily obtained by reversal of the connections of the rectifier 76 to which the resonant cavity output is applied.

Figure 7:
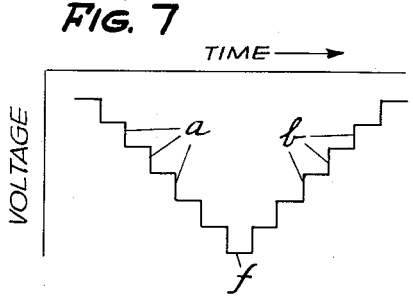

When the klystron frequency is caused to vary in steps with time in the manner above described by means of step oscillator 1, the rectified output voltage of the cavity, whose characteristic is shown in Fig. 6, varies with time in the manner shown in Fig. 7, since the frequency sweep of the klystron is from low to high frequency. This voltage, the waveform of which is shown in Fig. 7, is applied by means of lead 6 to the input of an amplifier 7. The voltage waveform of Fig. 7 is amplified by amplifier 7, and is applied to an RC coupling circuit, including a condenser 8 and a resistor 9. This RC circuit 8—9 has a low time constant, such that said circuit acts as a differentiating circuit to differentiate the signal applied to its input.

Figure 8:
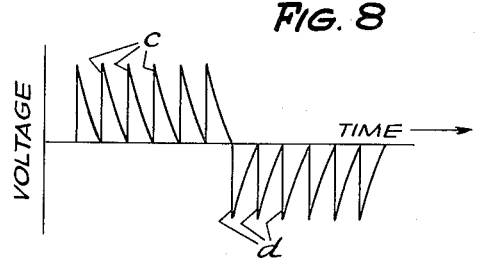

The differentiated waveform produced at the output of RC circuit 8—9 is, as shown in Fig. 8, a series of pulses c and d which result from, and are produced simultaneously with, the "risers" a and b of the stepped voltage wave of Fig. 7, which in turn result from, and are produced simultaneously with, the intermittent or pulsed frequency changes or modulations of the klystron 21 and the intermittent voltage changes of condenser 2. Throughout the present specification, when referring to waveforms in the shape of steps, terms commonly associated with steps or stairs will ordinarily be used; thus "risers" will be used to denote the vertical portions of such waveforms, while "treads" will be used to denote the horizontal portions of such waveforms. It is only the changes or "risers" e of the stepped voltage waveform of Fig. 5 which produce the changes or "risers" a and b of the Fig. 7 waveform, since only the changes in the condenser voltage waveform produce changes in frequency of the klystron 21 and changes in the output of the reference resonant cavity; between such condenser voltage changes there is no change in klystron frequency, consequently no change in output of the resonant cavity, and therefore no pulses in the output of differentiating circuit 8—9. The output of circuit 8—9, shown in Fig. 8, consists of pulses which reverse in polarity just after the bottom f of the waveform of Fig. 7, since at said bottom the direction of the respective "risers" a and b thereof in effect reverses. Comparing Figs. 7 and 8, it may be seen that there is a reversal of polarity as between the two waveforms; that is, the positive pulses c of Fig. 8 correspond in time to the negative "risers" a of Fig. 7. This is due to the fact that Fig. 7 represents the waveform of the input to amplifier 7, and amplifier 7 inverts the waveform passing therethrough; in other words, the direction of the stepped wave in the output of amplifier 7, and applied to circuit 8—9, would be the opposite of that shown in Fig. 7, with initial positive voltage "risers" being followed by negative "risers."

The pulse waveform of Fig. 8, the output of circuit 8—9, is amplified and inverted by inverter 10 and then applied to the grid of an automatic frequency control blocking oscillator 11. The grid of oscillator 11 is negatively biased, so that this oscillator is a driven or one-shot blocking oscillator.

Since the pulse waveform of Fig. 8 is inverted by inverter 10, the waveform applied to the grid of oscillator 11 consists of a series of negative pulses followed by positive pulses, the change in polarity occurring after the bottom f of the Fig. 7 wave and just after the reaching by the klystron 21 of the resonant frequency of the reference-tuned cavity 75, the characteristic of which is shown in Fig. 6. When a positive pulse is applied to the grid of oscillator 11, said oscillator is triggered to produce a high-voltage output pulse which is applied across the primary 13 of an output transformer 14. The output pulse of oscillator 11 is inverted through a secondary winding 15 of transformer 14 and clipped by a rectifier 16 to bypass the negative backswing thereof away from the rest of the circuit connected to winding 15.

The output signal pulse of oscillator 11 is applied through a condenser 17 and a rectifier 18 to charge condenser 2 in a direction opposed to the charge placed thereon by oscillator 1, the amount of this opposition charge being determined by the voltage division between condensers 17 and 2. In other words, the original negative charge on condenser 2 is reduced, thereby reducing the negative voltage with respect to ground which is applied to the klystron repeller, causing a lowering of the output frequency of the klystron 21. The voltage divisions from the oscillator 11 to condenser 2 and from the oscillator 1 to condenser 2 are such that the former supplies an increment of charge to said condenser which is about three times as great as the latter.

Figure 9:
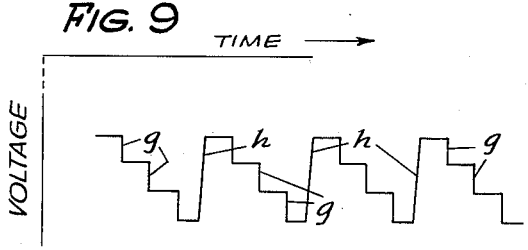

After the pulse supplied from oscillator 11 to reduce the original negative charge on condenser 2 and to reduce the original negative voltage applied to the klystron repeller ends, the klystron frequency is again raised in steps as condenser 2 re-accumulates its original negative charge or as the voltage across said condenser is again increased in the original negative direction by means of increments of charge supplied from step oscillator 1 through step rectifier 3. Thus, the klystron frequency oscillates back and forth through a small neighborhood about the reference cavity resonant frequency. Fig. 9 represents the voltage waveform on the klystron repeller with respect to its grounded cathode under the above-described automatic frequency control conditions. The downwardly-stepped portions g of the waveform represent the original periodic accumulations of negative charge on condenser 2, or the original increases of voltage across said condenser in a negative direction, caused by the negative increments of charge supplied to said condenser from oscillator 1; during the time of these steps, the klystron frequency is being increased in stepwise fashion. The substantially linear rising portions h of positive slope in the waveform of Fig. 9 represent the periodic reductions of the original negative charge on condenser 2, or the increases of voltage across said condenser in a positive direction, caused by the positive pulses supplied to said condenser from oscillator 11; during the time of each of these linear portions the klystron frequency is being rapidly and substantially uniformly lowered. Since oscillator 11 supplies a slug of charge to condenser 2 which is about three times as great as that supplied thereto by oscillator 1, the change of repeller voltage caused by the linear portions h of the waveform in Fig. 9 is represented as corresponding in amplitude or height to three steps g of the step voltage change produced by oscillator 1.

It has been stated previously that a sweep circuit is incorporated to sweep the klystron frequency automatically through the electrical tuning range of the klystron 21 until it is within the restricted lock-in range; this sweep circuit is provided by the limit blocking oscillator 19 acting with step oscillator 1. Oscillator 19 allows the klystron frequency to hunt over a range of about ±30 megacycles, when it is not locked in through the servoamplifier 6—18. From Fig. 5, which represents the staircase voltage waveform on the klystron repeller with respect to ground or its cathode under these sweeping conditions, it may be seen that, when a point 18 volts below the starting voltage is reached, the klystron repeller voltage as controlled by condenser 2 is caused to return to the starting voltage, where it again starts to step in a negative direction or down to −18 volts with respect to the starting voltage. Blocking oscillator 19 is so connected that a voltage of −18 volts across condenser 2 applied by lead 20 from the upper plate of condenser 2 to the blocking oscillator 19 will turn the tube of oscillator 19 on; when such tube conducts, a blocked oscillation is generated by oscillator 19, in such a direction as to drive the voltage of condenser 2 by means of lead 20 back to the original starting voltage to start the cycle again. Thus, in Fig. 5, the stepped portions e of the waveform represent the original negative voltage stepping of condenser 2 by step oscillator 1, while the vertical portion k of said waveform represents the driving of condenser 2 back to the starting voltage by a blocked oscillation of limit oscillator 19. As long as the klystron frequency is locked in through the servoamplifier 6—18, what might be called the "reversing" of the voltage (as opposed to the original stepping of the voltage by oscillator 1) is accomplished by oscillator 11 in the manner previously described in connection with Figs. 7–9; under these conditions the potential of the upper plate of condenser 2 never becomes sufficiently negative with respect to that of its lower plate to turn on oscillator 19, so that in the automatic frequency control condition oscillator 19 remains off. Oscillator 19 operates only when the unit is turned on, to bring the klystron frequency into lock-in range for servo operation, or in case the servoamplifier 6—18 fails to operate for some reason.

The above provides a somewhat general description of the operation of the system. Reference will now be made to Fig. 4 for a more detailed description of the circuit and its operation.

A reflex klystron 21 is the oscillator the frequency of which is to be stabilized or controlled by the servo system of the present invention. Such a klystron may include a repeller electrode 22 which is connected to lead 4 of the servoamplifier in order to apply a proper potential to said repeller electrode, the potential applied to repeller 22 by means of lead 4 being changed by the servoamplifier to change the output frequency of klystron 21. Said klystron also includes an emissive cathode 23 which is grounded, a control grid 24 biased slightly positive with respect to said cathode by means of a battery 25, and an internal resonant output cavity 26 providing two grids in the tube through which the electrons pass, cavity 26 being biased positively a few hundred volts with respect to cathode 23 by a battery 27 to provide an accelerating voltage. Although the potential sources 25 and 27 are illustrated as separate batteries, this has been done only for purposes of simplification, the potentials for electrodes 24 and 26 preferably being obtained from the main potential source for the servoamplifier. An output loop 28 is coupled to the internal cavity 26 in order to apply the output of klystron 21 to a coaxial transmission line 29. Said transmission line carries a portion of the klystron output to an intermediate frequency converter crystal (not shown) and the remaining portion of said output to a waveguide 30. Waveguide 30, together with a cavity structure to be later described, provides a sampling and error detecting device.

The step blocking oscillator 1 includes as the main element thereof a pentode 31 having anode 32, suppressor grid 33, screen grid 34, control grid 35, and cathode 36. Anode 32 is connected through one winding 37 of a pulse transformer 38 and through a resistor 39 to a source of positive potential (not shown), on the order of 120 volts. Suppressor grid 33 is connected directly to grounded cathode 36, while screen grid 34 is connected by way of leads 40 and 41 and resistor 39 to the positive potential source, a bypass condenser 42 being provided between said screen grid and ground or cathode 36. Control grid 35 is connected through a suitable resistor 43, winding 44 of pulse transformer 38, and another resistor 45, to lead 41 and the positive potential source, to bias said control grid positively. A blocking condenser 46 is provided in the grid circuit of blocking oscillator 1, the lower plate of said condenser being connected to ground and the upper plate of said condenser being connected to the junction point of resistor 45 and winding 44.

The dots at windings 37 and 44 indicate similar polarities, and this is also true at the other transformer windings in Fig. 4. For example, if a current flows through one winding so that the dot end is positive, the field set up in the core induces voltages in the other windings, making the dot end positive in these windings at the same time.

By means of the above-described connections, with the polarities of windings 37 and 44 as indicated, with control grid 35 connected to a positive voltage, and with blocking condenser 46 connected as indicated, no trigger pulses being applied, pentode 31 is made to operate and will operate as a free-running blocking oscillator at a rather high repetition rate, on the order of 200,000 pulses per second, such pulses or blocked oscillations being available at anode 32. As is understood by those skilled in the art, the initial voltage swing at the anode 32, when tube 31 conducts, is in the negative direction, causing the voltage with respect to ground to drop at said anode when tube 31 conducts.

In order to provide a charge on a condenser 47 before tube 31 conducts and during the intervals when it does conduct, this charge being such that the upper plate of said condenser has a positive potential with respect to ground and the lower plate of said condenser has a negative potential with respect to ground, the upper plate of said condenser, which is connected to anode 32, is also connected through winding 37 and resistor 39 to the positive potential source; the lower plate of said condenser is connected to anode 59 of a rectifier 5, the cathode 60 of which is connected by means of lead 50 to tap 52 of a dual potentiometer 51. In order to provide an adjustable potential negative with respect to ground at tap 52, resistors 54, 53 and 56 are connected in series in that order between ground 55 and a lead 57 which is connected to a negative potential source; tap or arm 52 engages and moves along potentiometric resistor 53. A resistor 61 is connected across rectifier 5, while a by-pass condenser 58 is connected between arm 50 or tap 52 and ground.

Assuming for purposes of illustration that tap 52 is located at such a point that the potential at said tap is negative 100 volts with respect to ground and that the potential of the positive source is 120 volts, the condenser 47 is charged to a voltage of 220 volts during non-conduction of tube 31 through a circuit traced as follows: positive side of the positive source, resistor 39, winding 37, condenser 47, anode 59 and cathode 60 of rectifier 5, negative tap 52 of potentiometer 51, the positive side or ground of said potentiometer, and the grounded or negative side of the positive source. Since the voltage between potentiometer tap 52 and ground and the voltage of the positive source are connected in series aiding in this circuit, the voltage across condenser 47 is the sum of these two voltages and the upper plate condenser 47 has a potential of +120 volts with respect to ground and the lower plate of said condenser has a potential of —100 volts with respect to ground.

A parallel circuit to the one already described is provided between the lower plate of condenser 47 and tap 52, this circuit including in series, from said plate of said condenser, the cathode 48 of rectifier 3, the anode 49 of said rectifier, the main condenser 2, and lead 50.

When tube 31 conducts in accordance with the blocking oscillator operation of the circuit 1, its anode voltage with respect to ground or cathode 36 decreases substantially instantaneously, and for the purposes of the present discussion it may be assumed that this decrease amounts to 60 volts. At the instant of conduction in tube 31, its anode voltage with respect to ground and also the voltage on the upper plate of condenser 47 with respect to ground drop to +60 volts from their original +120 volts. Since the charge on condenser 47 cannot change instantaneously, at said instant of conduction the lower plate of condenser 47 follows in potential the upper plate, also dropping 60 volts and reaching a potential of —160 volts with respect to ground. This —160 volt absolute potential is more negative than the —100 volt absolute potential of tap 52, which means that the cathode 48 of rectifier 3 is negative with respect to its anode 49 by some 60 volts, a condition permitting conduction in said rectifier. During the original pulse of blocking oscillator 1, then, while tube 31 is conducting and while its anode is +60 volts with respect to its cathode or ground, condenser 47 partially discharges through tube 31, ground, resistor 54, part of resistor 53, lead 50, condenser 2, and rectifier 3, until the lower plate of condenser 47 reaches approximately the potential of tap 52, which is —100 volts with respect to ground. When it does so, discharge of condenser 47 stops because at such time the cathode 48 of rectifier 3 will no longer be negative with respect to its anode 49. During this time of discharge while tube 31 is conducting, the anode 59 of rectifier 5, connected to the lower plate of condenser 47, is negative with respect to its cathode, connected to lead 50, so that said rectifier cannot conduct. Throughout the present specification, the phrase "absolute potential" or "absolute voltage" of an element means the potential or voltage of such element with respect to ground.

During the time of this partial discharge of condenser 47 to a voltage of approximately 160 volts thereacross (its upper plate remaining at an absolute potential of +60 volts and its lower plate going to an absolute potential of approximately —100 volts), condenser 2 is charged, in such a direction that its upper plate goes negative with respect to its lower plate, to a small voltage, on the order of 0.15 volt, for example, this voltage change across condenser 2 being determined by the relation between the capacitances of condensers 47 and 2 and being much smaller than the change of the voltage across condenser 47 because the capacitance of condenser 2 is very large compared to the capacitance of condenser 47. Thus, a small increment of charge is supplied to condenser 2 for or during each successive pulse of oscillator 1; in this way, condenser 2 is step charged with its upper plate negative with respect to its lower plate in response to the operation of oscillator 1.

When tube 31 is cut off because of the blocking action of condenser 46, this cutoff of said tube being substantially instantaneous, the absolute voltage of anode 32 or the upper plate of condenser 47 instantaneously returns to +120 volts, the voltage of the positive potential source. Thus, the absolute potential of said upper plate rises 60 volts, and, since this change occurs substantially instantaneously and the charge on condenser 47 cannot change instantaneously, the absolute potential of the lower plate of condenser 47 also rises 60 volts at this instant, from approximately —100 volts with respect to ground to approximately —40 volts with respect to ground. This approximately —40 volt absolute potential is less negative or more positive than the —100 volt absolute potential of tap 52, which means that the cathode 60 of rectifier 5 is negative with respect to its anode 59 by some 60 volts, a condition permitting conduction in said rectifier. After the original pulse of blocking oscillator 1, therefore, and between successive pulses, condenser 47 recharges through its original charging circuit to substantially its original value of charge, tube 31 being non-conducting or cut off during this time. Condenser 47 is recharged to a voltage of substantially 220 volts thereacross, the absolute potential of its upper plate at the end of this charging period being +120 volts and the absolute potential of its lower plate at this time being —100 volts. When condenser 47 is so charged, the charging thereof stops because at such time the cathode 60 of rectifier 5 will no longer be negative with respect to its anode 59.

During this time of recharging of condenser 47 while tube 31 is cut off or in the non-conducting condition, the cathode 48 of rectifier 3, connected to the lower plate of condenser 47, is positive with respect to its anode, connected to condenser 2 and lead 50, so that said rectifier cannot conduct. Also, since condenser 2 is charged during the pulses of blocking oscillator 1 in such a direction that its upper plate becomes negative with respect to its lower plate, the potential applied to the cathode 48 of rectifier 3 from the lower plate of condenser 2 through resistor 61 is positive with respect to the voltage applied directly from the upper plate of condenser 2 to the anode 49 of said rectifier, so that said rectifier cannot conduct to discharge condenser 2. Therefore, the increments of charge supplied to condenser 2 during each pulse of oscillator 1 or during each time of conduction of tube 31 are trapped thereon, so that condenser 2 is charged in a stepwise manner by the operation of blocking oscillator 1, with its upper plate going negative with respect to its lower plate. The upper plate of condenser 2 is connected, by means of leads 20 and 4, directly to repeller 22 of controlled klystron 21, in order to apply the absolute potential of said upper plate or the voltage of said upper plate with respect to ground, as a controlling potential on repeller 22 with respect to the grounded cathode 23. A predetermined bias voltage is provided on repeller 22 through condenser 2 by lead 50 from tap 52, since the lower plate of said condenser is connected directly to lead 50; the voltage at tap 52 is negative with respect to ground so that a negative bias with respect to grounded cathode 23 is provided on repeller 22 by means of the above-described connection. An adjustable potential negative with respect to ground 55 or klystron cathode 23 is provided through condenser 2 to repeller 22, to adjustably bias said repeller negatively with respect to cathode 23. Since the said bias voltage is negative with respect to ground, and since condenser 2 is step charged by the operation of oscillator 1 with its upper plate becoming negative with respect to its lower plate, the potential on the upper plate of condenser 2 with respect to ground has the stepped waveform represented in Fig. 5, such potential being originally negative and becoming more negative at steps $e$. The proper operation of a reflex klystron requires that the repeller voltage with respect to the cathode be negative at all times. The step increases $e$ in the negative direction of the absolute potential on the upper plate of condenser 2, such absolute potential being applied to repeller 22, cause the output frequency of klystron 21 to sweep in a stepwise manner from a low to a high value.

Figure 5:
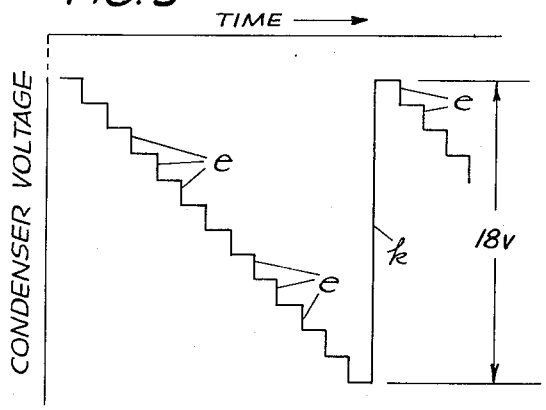
Figs. 5–9 represent waveforms occurring under various conditions and at various points in the circuit of Fig. 4.

It is advantageous to provide a "linear staircase" charging of condenser 2 by the operation of oscillator 1, to make all the "risers" $e$ in Fig. 5 of substantially equal height. This linear charging, rather than exponential charging, is desirable, and may be accomplished by applying to the condenser constant current pulses rather than constant voltage pulses, since the latter provide exponential charging of said condenser because of the opposing voltage across said condenser as the charge on the condenser increases. This invention contemplates and accomplishes staircase charging of condenser 2 or staircase variation of the voltage across said condenser from a source of substantially constant current pulses. Tube 31 is a pentode and therefore has plate characteristics such that, for each value of control grid voltage, the plate voltage-plate current curve has a portion of substantially constant positive slope and a portion of substantially zero slope. The latter portion is known as the constant current portion of the pentode characteristic.

According to this invention, blocking oscillator pentode 31 is so operated as to in effect supply constant current increments to condenser 2 each time said tube conducts by means of the discharge circuit for condenser 47 as previously described. When tube 31 generates a blocked oscillation, grid current flows therein because the grid 35 of said tube is driven positive by the plate voltage change. The resistance of resistor 43 is large compared to the grid-cathode resistance of approximately 1,000 ohms which exists when grid current is drawn in almost all vacuum tubes. The resistor 43 and the grid-cathode resistance of tube 31 provide a voltage divider. Since resistor 43 has a rather high resistance, the flow of grid current in tube 31 is limited, thus limiting the positive voltage on the grid 35 with respect to ground during conduction in tube 31. The said positive grid voltage is limited to a value such that pentode 31 is limited to a constant current region for the plate voltage thereon and does not reach the region of positive slope in its plate characteristic grid-voltage family for said plate voltage, which it would do if the positive absolute voltage on the grid were not so limited but were allowed to increase. By so limiting pentode 31 to its constant current region during conduction, it in effect provides a constant current discharge circuit for condenser 47 each time it conducts, thus providing increments of constant current to condenser 2 to produce linear staircase or stepwise charging of condenser 2.

The limit blocking oscillator 19 will next be described. Oscillator 19 includes, as the main element thereof, a triode 62 having anode 63, grid 64, and cathode 65. Cathode 65 is connected directly to the upper plate of main condenser 2, so that the potential on this plate is applied at all times directly to said cathode. Grid 64 is connected through one winding 66 of a pulse transformer 67 to a lead 68 which is in turn connected to a movable arm or tap 69 of potentiometer 51. Arms 52 and 69 are mechanically coupled together, as indicated, so that they move together. The potentiometric resistor 70 which arm 69 engages has one end connected through resistor 71 to ground 55 and its opposite end connected to lead 57, which is connected to a negative potential source. In this way, a negative bias potential with respect to ground is applied to control grid 64, said grid of tube 62 being biased to a point that requires a relatively large negative voltage with respect to ground applied to cathode 65 to turn tube 62 on. A bypass condenser 72 is connected between leads 50 and 68.

Anode 63 is connected through a winding 73 of transformer 67 to the lower plates of condenser 2, a small condenser 74 being connected across winding 73. The voltage across condenser 2 is therefore the anode-cathode voltage of tube 62. The —18 volts applied to cathode 65 necessary to turn tube 62 on means that, when condenser 2 is charged to —18 volts so that its upper plate or the cathode 65 has a potential of —18 volts with respect to its lower plate or the anode 63, tube 62 will conduct, but when condenser 2 is charged to less than —18 volts, tube 62 will not conduct. Taps 52 and 69 of the dual potentiometer 51 are mechanically coupled together in such a way that the potential of tap 69 applied to grid 64 will at all times, throughout the range of movement of said taps for variation of the bias on repeller 22, be negative, with respect to that applied by tap 52 to the lower plate of condenser 2 and said repeller, by an amount just slightly less than the algebraic sum of the —18 volt figure selected and the cutoff voltage of tube 62 with 18 volts applied between the anode 63 and the cathode 65. In this way, it is assured that, when a potential of 18 volts across condenser 2 is reached, during the charging thereof by the operation of oscillator 1, tube 62 will conduct.

Condenser 2 is, in effect, the blocking condenser for blocking oscillator 19, this condenser being in the cathode circuit of this limit blocking oscillator and serving as a cathode blocking condenser, rather than this oscillator being provided with a grid blocking condenser as in other blocking oscillators. When tube 62 conducts, at the end of the sweep, or when the voltage across condenser 2 reaches 18 volts, there is an excess of electrons on the upper plate of condenser 2, since at this time the upper plate of said condenser is at a potential of —18 volts relative to the lower plate thereof. When tube 62 conducts, electrons are drawn off the upper plate of condenser 2 by drawing them from the cathode 65 which is connected to said upper plate, causing the upper plate of condenser 2 to go back in a positive direction, discharging said condenser. Thus, the negative voltage sweep or charging of condenser 2 is ended, permitting step oscillator 1 to begin its next cycle of stepwise charging of condenser 2, and at the same time cutting off tube 62 by dropping its anode-cathode voltage to substantially zero. Oscillator 19 is thus a driven or one-shot blocking oscillator.

Referring again to Fig. 5, the stepwise increasing in a negative direction of the absolute voltage on the upper plate of condenser 2 is produced by the charging of said condenser by the operation of step blocking oscillator 1, while the substantially vertical increase, in a positive direction, of said absolute upper plate voltage as at $k$ (when the voltage across the condenser has reached 18 volts) is produced by the discharging of said condenser 2, by limit blocking oscillator 19, in the manner just described. Tube 62 remains cut off, and blocking oscillator 19 remains blocked, until the voltage across condenser 2 again reaches −18 volts at the end of the next staircase sweep of said voltage by the operation of step oscillator 1, at which time tube 62 again conducts because of the sufficiency of the anode-cathode voltage thereon, the grid bias permitting conduction under these voltage conditions; when tube 62 conducts, condenser 2 again is discharged.

These voltage variations during the hunting or sweeping condition cause staircase-sweep frequency modulation of the klystron output frequency from low to high frequency, followed by almost instantaneous return of said klystron output frequency from high to low frequency.

Waveguide 30 has coupled thereto, intermediate its ends, a resonant cavity 75 which may, for example, be a circular cylindrical cavity resonating in the $TE_{1,1,1}$ mode. Said cavity serves as a reference standard of frequency, providing a bandpass filter having an output voltage-frequency response characteristic of the slope generally shown in Fig. 6, which is similar to the conventional curve for a singly resonant circuit. A crystal detector 76 is also coupled to waveguide 30, at the output side of the filter 75, the pilot signal from local oscillator 21 being fed into the input of filter 75 by transmission line 29 and waveguide 30, as previously described.

The rectified modulation signal of the output of the waveguide and cavity structure appears at the output leads 6 of crystal detector 76. When the klystron output frequency is caused to vary in steps by the operation of step oscillator 1 in thet manner previously described, the curve of Fig. 6 appears on a time scale as shown in Fig. 7. The waveform curve of Fig. 7 represents, therefore, the waveform of the voltage produced between leads 6.

One of the leads 6 is connected to ground 55, while the other is connected through a coupling condenser 77 to the control grid 78 of the pentode 79 which serves as the amplifier stage 7. A leak resistor 80 is connected between control grid 78 and grounded cathode 81 of pentode 79. Suppressor grid 82 of tube 79 is connected to cathode 81. Screen grid 83 of said tube is connected through a resistor 84 to a source of positive potential on the order of 120 volts, a bypass condenser 85 being connected between grid 83 and ground 55 or cathode 81. Anode 86 of tube 79 is connected through a pair of resistors 87 and 88 to a source of positive potential, not shown, on the order of 120 volts. By means of the aforesaid connections, pentode 79 operates as an amplifier to amplify the voltage wave of Fig. 7, which is the input to said amplifier, tube 79 also functioning to invert the input signal thereto.

In order to couple the output of amplifier 7 to the inverter 10, anode 86 is connected through a coupling condenser 8 having a low capacitance to the control grid 89 of an amplifier and inverter pentode 90, the coupling circuit being completed by a leak resistor 9 connected between grid 89 and ground 55. The RC coupling circuit 8—9 has a low time-constant, such that said circuit acts to differentiate the signal applied to its input, which signal is the output of amplifier 7. The differentiated waveform, the output of coupling circuit 8—9 or the input signal of amplifier and inverter stage 10, has the shape shown in Fig. 8, it being remembered that the input signal to circuit 8—9 has a waveform of the same character as that shown in Fig. 7 but inverted with respect thereto. Due to the differentiating action of circuit 8—9, a steep impulse is produced in the output of said circuit simultaneously with each of the "risers" $a$ and $b$ in the stepped waveform of Fig. 7, since during these risers the time rate of change of the input voltage of circuit 8—9 is very large, while during the "treads" of the steps the time rate of change of the input voltage of said circuit is substantially zero. The output pulses of circuit 8—9 therefore coincide in time with corresponding risers in the steps of Fig. 7. The initial pulses $c$ of Fig. 8 are in a positive direction, since the initial risers in the input wave to circuit 8—9 are in a positive direction, the inverse of Fig. 7. The polarity of the output pulses of circuit 8—9 reverses at or immediately after the time of the bottom $f$ of the Fig. 7 wave, since at this time the direction of the risers of Fig. 7 reverses, making negative risers at the input of circuit 8—9 and consequent negative pulses $d$ at the output of said circuit simultaneously with such negative risers.

From a comparison of Figs. 6 and 7, it may be seen that the bottom $f$ of the wave of Fig. 7, or the reversal of the direction of the risers $a$ and $b$ thereof, occurs when the resonant frequency of the reference cavity 75 is reached by the step-frequency-modulated klystron 21. Since this is so, the reversal of polarity of the output pulses of circuit 8—9 occurs simultaneously with the reaching of the resonant frequency of cavity 75 by the klystron 21. Thus, pulses for error detection are obtained by differentiation of the rectified output of cavity 75, the polarity of these pulses indicating the direction of error from the target frequency or resonant frequency of reference cavity 75.

The servo amplifier is inherently low-microphonic. Because of the low time constant of circuit 8—9 in the grid circuit of the second amplifier tube 90, frequencies in the microphonic range are considerably attenuated.

The pentode 90 of the amplifier and inverter stage 10 includes, in addition to control grid 89, an anode 91, a suppressor grid 92 connected to grounded cathode 93, and a screen grid 94 connected to the positive potential source through resistor 84. Anode 91 is connected through a resistor 95 to resistor 88 and the source of positive plate potential. A bypass condenser 96 is connected between the junction of resistors 88 and 95 and ground 55. Pentode 90 functions to amplify and invert the input pulses $c$ and $d$ of Fig. 8 applied thereto, to provide in the output of said pentode negative impulses followed by positive impulses, the positive impulses occurring after the resonant frequency of reference cavity 75 has been reached.

In order to couple the output of amplifier and inverter stage 10 to the automatic frequency control blocking oscillator 11, anode 91 is connected through a coupling condenser 97 to the control grid 98 of a triode 99 which constitutes the heart of the driven or one-shot blocking oscillator 11. In order to bias grid 98 negatively with respect to grounded cathode 107, to provide the desired one-shot action for tube 99, a pair of resistors 101 and 102 is connected in series between ground 55 and negative lead 57 to provide a voltage divider; the common junction of these two resistors is connected through a grid resistor 100 to grid 98. A bypass condenser 103 is connected across resistor 101, the interwinding capacity of transformer 14 providing the blocking capacitance for blocking oscillator 11. Anode 104 of triode 99 is connected through a winding 13 of block-oscillator transformer 14 and through a resistor 105 to the positive potential source, a bypass condenser 106 being connected between ground and the junction between resistor 105 and winding 13.

Blocking oscillator triode 99 is connected so that the feed-back winding of transformer 14 is in the cathode circuit, the grid 98 not being connected directly to the transformer; to carry out this purpose, cathode 107 is connected through winding 108 of transformer 14 to ground at 109. Thus, during the trigger period, before tube 99 goes into a blocked oscillation, the grid 98 has a sufficiently high negative bias to cut off the tube and thus the grid circuit presents a high impedance to the previous plate 91, resistor 100 having a high impedance, permitting the use of high enough plate impedance in tube 90 to develop considerable amplification. Therefore, blocking oscillator 11 can be triggered directly from a high-impedance source without a trigger tube.

Transformer 14 is a special blocking oscillator transformer particularly adapted to this type of operation. The turns ratio from plate to cathode to output winding 15 is 3:1:1.5, and approximately the same amplitude pulse is developed across each winding because of capacitive coupling and possibly because of saturation effects. The coils are wound for minimum capacity to each other.

A clamping diode rectifier 12 has its cathode 110 connected to grid 98 and its anode 111 connected to the ungrounded side of resistor 101. Grid 98 is negatively biased, as stated above, so that tube 99 is normally off or non-conducting. When the grid 98 is triggered in a positive direction by a positive pulse appearing in the output of stage 10, tube 99 conducts, the voltage of plate 104 goes in the negative direction, and a voltage is induced in cathode winding 108 driving cathode 107 negative, which is in a regenerative direction.

Without rectifier 12, grid 98 is tied to a high-impedance circuit, since resistor 100 has a high impedance. The grid-cathode resistance of tube 99, when the cathode 107 becomes negative and grid current is drawn, is low, and the circuit impedance of the cathode is low. Thus, the grid 98 is driven by the cathode circuit, and becomes almost as negative as the cathode. Because the grid 98 is then not very positive with respect to the cathode 107, the plate current through tube 99 is not very high, and the output pulse at output transformer winding 15 is unsatisfactory in voltage amplitude.

However, with rectifier 12 connected as disclosed, grid 98 is no longer tied to a high-impedance circuit when grid current is drawn, since when grid current flows the electron flow is from cathode 107 to grid 98, cathode 110, anode 111, to ground and back to cathode 107. Rectifier 12 will conduct when electron flow is in this direction, and the impedance of said rectifier is very low when the same conducts, providing therefore substantially a short circuit across resistor 100; as a result, under these conditions grid 98 has a low external circuit impedance when grid current is drawn. Due to this low external circuit impedance, grid 98 is clamped by rectifier 12. Thus, large grid current can flow and grid 98 is no longer driven by the cathode circuit but can remain very positive with respect to cathode 107 as said cathode is driven negative. Heavy pulse current then flows in tube 99 as a result of this large positive grid voltage with respect to the cathode, approximately 80 volts being developed across the load with a 120-volt plate supply during the blocked oscillation generated.

Tube 99 is operated near cutoff so that only the positive-going portion of the pulse output signal of stage 10 causes said tube to be triggered. As described above, the positive pulses occur after the resonant frequency of reference cavity 75 has been reached. The additional negative voltage provided on the grid 98 of tube 99 by the charging of condenser 103 when blocking oscillator 11 generates a blocked oscillation is such that any positive pips or pulses come through amplifier 10 within a short interval after a trigger pip, before condenser 103 discharges through resistor 101, have no effect. Thus, there is no likelihood of tube 99 generating free-running pulses. It will trigger only immediately after a pulse of step oscillator 1, which latter pulse operates to vary the charge on condenser 2, the voltage on repeller 22, and the output frequency of klystron 21, this variation of klystron output frequency resulting in a positive pulse to trigger oscillator 11 if the klystron output frequency is above the resonant frequency of reference cavity 75, and in a negative pulse of the klystron output frequency is below said resonant frequency.

Secondary winding 15 of blocking oscillator transformer 14 is connected as indicated by the dots adjacent windings 13 and 15. The upper end of winding 15 is connected through a condenser 17 to the anode 112 of a diode rectifier 18 the cathode 113 of which is connected to the lead 20 and the upper plate of main condenser 2. The lower end of winding 15 is connected to negative potential lead 68. A diode rectifier 16 has its cathode 114 connected to the common junction of condenser 17 and anode 112, and its anode 115 connected to lead 68 and the lower end of winding 15. A resistor 116 is connected across rectifier 16. Rectifier 16 functions as a clipper to remove or bypass the negative backswing of the output pulse of oscillator 11, which appears across winding 15, away from the remainder of the output circuit including rectifier 18 and condenser 2, and also to discharge condenser 17 after a pulse of oscillator 11, since after such pulse the left-hand plate of said condenser, or anode 115, is positive with respect to the righthand plate of said condenser, or cathode 114, and since after such pulse the lower end of winding 15 returns to the absolute potential established by tap 69. Here, the term "negative" means that the upper end of winding 15 is negative with respect to its lower end. Under these conditions, cathode 114 of rectifier 16 is negative with respect to its anode 115, and said rectifier conducts.

As previously stated, the potential of tap 69 is at all times negative with respect to that of tap 52. Lead 68, connected to tap 69, therefore applies a potential, through resistor 116 to the anode 112 of rectifier 18, which is negative with respect to that applied by lead 50 from tap 52 through condenser 2 to the cathode 113 of said rectifier. Thus, rectifier 18 is biased with its anode negative with respect to its cathode, so that it will present a high-resistance direct current path to the step charge on main condenser 2, in which the upper plate of condenser and cathode 113 are negative with respect to the lower plate of said condenser.

Condensers 17 and 2 function as a capacitance-type voltage divider. The voltage of the pulse developed across the load by oscillator 11 is sufficient to overcome the bias on rectifier 18 and charge condenser 2 in a direction the reverse of the step charge by an amount determined by the voltage division between condensers 17 and 2. In other words, the output pulse generated by blocking oscillator 11 when it is triggered is applied through condenser 17 and rectifier 18 to reduce the step charge on main capacitor 2, this step charge having been placed thereon by the action of step blocking oscillator 1 in the manner previously described. This reduction of the step charge on condenser 2 reduces the negative voltage applied to the klystron repeller 22 and causes the output frequency of the klystron 21 to be lowered. The circuit from the winding 15, across which the generated pulse appears, to condenser 2 may be traced as follows: upper end of winding 15, condenser 17, anode 112 and cathode 113 of rectifier 18, condenser 2, lead 50, condenser 72, and lead 68, to the lower end of winding 15, the condenser 72 normally being charged to a voltage equal to the potential difference between leads 50 and 68.

The voltage division from the automatic frequency control blocking oscillator 11 to condenser 2 and that from the step blocking oscillator 1 to condenser 2 are such that the former supplies a slug of charge about three times as great as the latter. When the pulse from transformer 14 ends, the klystron frequency is again raised in steps as condenser 2 accumulates a step charge from oscillator 1 through rectifier 3. Since in the stepwise sweep of the charge on the upper plate of condenser 2 negatively with respect to ground or the staircase sweep of the klystron 21 from low to high frequency by step oscillator 1, positive pulses are produced in the output of circuit 8—9 after the resonant frequency of reference cavity 75 has been reached and simultaneously with the frequency changes of klystron 21, since positive pulses trigger the automatic frequency control blocking oscillator 11 to reduce the step charge on condenser 2, and since oscillator 11 supplies a slug of charge to condenser 2 about three times as great as that supplied thereto by oscillator 1, the waveform of the voltage with respect to ground on the klystron repeller is as shown in Fig. 9, and the klystron frequency oscillates about the resonant frequency of cavity 75. In other words, when the servoamplifier 6—18 is in operation or when the system is in the automatic frequency control condition, the waveform of the voltage with respect to ground on klystron repeller 22 is as shown in Fig. 9, in which the downwardly-stepped portions g represent the periodic accumulations of charge on condenser 2 produced by the operation of step oscillator 1 and in which the substantially linear rising portions h of positive slope represent the periodic reductions of charge on said condenser caused by the supply of corresponding positive pulses to said condenser from oscillator 11. During the time of the steps g in Fig. 9, the klystron frequency is being increased in stepwise fashion, while during the time of the positively-sloping linear rising portions h the klystron frequency is lowered.

The limit blocking oscillator 19 operates in the manner previously described to cause hunting of the absolute potential of the upper plate of condenser 2 and of the klystron frequency over a rather wide range which includes the lock-in range of the servoamplifier 6—18, when the klystron frequency is not locked in through the servoamplifier for some reason.

The servo system of this invention not only supplies error information in the form of pulses, as illustrated in Fig. 8, but correction is by means of pulses. The two amplifier stages 7 and 10 feed blocking oscillator 11 and, as long as the positive pulse at the input to oscillator 11 is sufficient to trigger the same, the system is insensitive to any further change in amplitude, whether it be due to degree of error or to modulation of the signal at microphonic frequency.

The mechanism of frequency correction is as follows. If the klystron output frequency is below the resonant frequency of reference cavity 75, the staircase sweep drives the klystron frequency in the correct direction. Correction takes place at about 500 kilocycles per five-microsecond step, or one megacycle in ten microseconds. If the klystron frequency is above the resonant frequency of the reference cavity, but within lock-in range, then for each slug of charge from the action of step blocking oscillator 1 into condenser 2, driving the klystron frequency one step higher, the automatic frequency control blocking oscillator 11 charges condenser 2 three times as much in the opposite direction, since for each such slug from oscillator 1 a positive pulse is produced which triggers oscillator 11. Thus, with each pulse of the step blocking oscillator, the klystron frequency moves in the correct direction (3−1) 500=1000 kc., until it is back in the neighborhood of the correct frequency. Correction thus takes place at about 1000 kilocycles per five-microsecond step, or one megacycle in five microseconds. If for some reason the klystron frequency is above the resonant frequency but outside lock-in range, it will step to the highest frequency, where the limit blocking oscillator 19 triggers off, and the klystron frequency returns to the lowest value, whence it steps to the correct frequency, all within about 600 microseconds.

The high frequency of operation of this system makes it possible to correct satisfactorily for frequency modulation due to vibration of the klystron elements or due to power supply ripple. It also reduces the effects of leakage from condenser 2, and makes it possible to use a smaller condenser in this location. In fact, one of the main advantages of my invention is that there are not very many condensers of large capacity used in the entire system.

Due to the use of a differentiating circuit in the present system, which produces pulses of opposite polarities above and below the resonant frequency of system, the output of the error detector itself, which is illustrated in Fig. 7, need not have sense.

Of course, it is to be understood that this invention is not limited to the particular details as described above, as many equivalents will suggest themselves to those skilled in the art. For example, since the servo system of this invention is well adapted for frequency stabilization, it can control frequency by controlling a reactance or resistance tube, or by controlling voltage in any system of which the frequency is a function of a voltage. The control of the output frequency of a klystron oscillator by control of its repeller voltage has been described herein merely by way of example. The system of this invention can be used to control other quantities than frequency if the error detector response has the form of a resonance curve. Various other variations will suggest themselves. It is accordingly desired that the appended claims be given a broad interpretation commensurate with the scope of this invention within the art.

What is claimed is:

1. An error detector for a frequency stabilizing system comprising: an oscillator for generating electrical oscillations of a predetermined frequency; tuned means coupled to said oscillator and having a response characteristic symmetrical with respect to said predetermined frequency; means for frequency modulating said oscillator in a series of relatively minor additive steps followed by a single relatively major subtractive step traversing a frequency band including said predetermined frequency; and means for rectifying the output of said tuned means to obtain a control voltage the amplitude and polarity of which are functions, respectively, of the magnitude and direction of the deviation of the frequency of said oscillator from said predetermined frequency.

2. An error detector for a frequency stabilizing system comprising: an oscillator for generating electrical oscillations of a predetermined frequency in the microwave region of the electromagnetic spectrum; a cavity resonator coupled to said oscillator and tuned to said predetermined frequency; said cavity resonator having a response characteristic symmetrical with respect to said predetermined frequency; means for frequency modulating said oscillator in a series of additive steps followed by a single subtractive step traversing a frequency band including said predetermined frequency; and means for rectifying the output of said cavity resonator to obtain a control voltage the amplitude and polarity of which are functions, respectively, of the magnitude and direction of the deviation of the frequency of said oscillator from said predetermined frequency.

3. An error detector for a frequency stabilizing system comprising: an oscillator for generating electrical oscillations of a predetermined frequency; tuned means coupled to said oscillator and having a response characteristic symmetrical with respect to said predetermined frequency; a source of pulses coupled to said oscillator for frequency modulating said oscillator in steps of small magnitude in the additive direction and of larger magnitude in the subtractive direction, all of said steps being within a narrow band including said predetermined frequency; and means for rectifying the output of said tuned means to obtain a stepped control voltage the instantaneous amplitude and polarity of which are functions, respectively, of the magnitude and direction of the deviation of the frequency of said oscillator from said predetermined frequency.

4. An error detector for a frequency stabilizing system comprising: an oscillator for generating electrical oscillations of a predetermined frequency in the microwave region of the electromagnetic spectrum; a cavity resonator coupled to said oscillator and tuned to said predetermined frequency; said cavity resonator having a response characteristic symmetrical with respect to said predetermined frequency; a source of pulses coupled to said oscillator for frequency modulating said oscillator in steps of small magnitude in one direction and of larger magnitude in the opposite direction, all of said steps being within a band including said predetermined frequency; and means for rectifying the output of said cavity resonator to obtain a stepped control voltage the instantaneous amplitude and polarity of which are functions, respectively, of the magnitude and direction of the deviation of the frequency of said oscillator from said predetermined frequency.

References Cited in the file of this patent

UNITED STATES PATENTS

| | | |
|---|---|---|
| 2,404,568 | Dow | July 23, 1946 |
| 2,462,294 | Thompson | Feb. 22, 1949 |
| 2,475,074 | Bradley | July 5, 1949 |
| 2,510,095 | Frankel | June 6, 1950 |
| 2,583,023 | Spangenberg | Jan. 22, 1952 |
| 2,640,156 | Schultz | May 26, 1953 |
| 2,640,157 | Wallman | May 26, 1953 |